(12) United States Patent
Liao

(10) Patent No.: US 11,367,204 B1
(45) Date of Patent: Jun. 21, 2022

(54) MULTI-SENSOR SPATIAL DATA AUTO-SYNCHRONIZATION SYSTEM AND METHOD

(71) Applicant: Ming Liao, Whittier, CA (US)

(72) Inventor: Ming Liao, Whittier, CA (US)

(73) Assignee: ECOTRON LLC, Whittier, CA (US)

( * ) Notice: Subject to any disclaimer, the term of this patent is extended or adjusted under 35 U.S.C. 154(b) by 0 days.

(21) Appl. No.: 17/552,796

(22) Filed: Dec. 16, 2021

(51) Int. Cl.
| | |
|---|---|
| *G06K 9/00* | (2022.01) |
| *G06T 7/30* | (2017.01) |
| *G06V 10/22* | (2022.01) |
| *G06T 7/70* | (2017.01) |
| *G06T 7/13* | (2017.01) |
| *G06T 7/11* | (2017.01) |

(52) U.S. Cl.
CPC .............. *G06T 7/30* (2017.01); *G06T 7/11* (2017.01); *G06T 7/13* (2017.01); *G06T 7/70* (2017.01); *G06V 10/22* (2022.01); *G06T 2207/10028* (2013.01)

(58) Field of Classification Search
CPC .................................................. G06T 19/00
See application file for complete search history.

(56) References Cited

U.S. PATENT DOCUMENTS

| | | | | |
|---|---|---|---|---|
| 6,922,234 B2 * | 7/2005 | Hoffman | .............. | G01C 11/025 702/159 |
| 2013/0148851 A1 * | 6/2013 | Leung | ..................... | G06T 7/579 382/103 |
| 2020/0043186 A1 * | 2/2020 | Selviah | .............. | G06V 10/7515 |

* cited by examiner

*Primary Examiner* — Hadi Akhavannik
(74) *Attorney, Agent, or Firm* — Cohen IP Law Group, PC; Michael N. Cohen

(57) ABSTRACT

A multi-sensor spatial data auto-synchronization system and method is provided. The method may include collecting laser point cloud data through a laser radar and pre-processing the laser point cloud data; collecting image point cloud data through a monocular camera and collecting intrinsic parameters of the camera by using a calibration board; performing plane fitting on the pre-processed laser point cloud data to determine coordinates of fitted laser point cloud data; performing image feature extraction on the image point cloud data; calculating pose transformation matrices for the laser point cloud data coordinates and an image feature data result by using a PNP algorithm; and optimizing a rotation vector and a translation vector in the pose transformation matrix. The present invention achieves automatic calculation of a spatial synchronization relationship between two sensors, and greatly improves the data synchronization precision of the laser radar and the monocular camera.

4 Claims, 9 Drawing Sheets

MULTI-SENSOR SPATIAL DATA AUTO-SYNCHRONIZATION SYSTEM AND METHOD

FIELD OF THE INVENTION

The present invention belongs to the field of autonomous driving technologies, including multi-sensor spatial data auto-synchronization systems and methods.

BACKGROUND

As is known in the art, visual sensors are often used in the technical field of autonomous vehicles for providing rich environmental information in real time during the automated driving experience. However, while these types of sensors provide high-resolution data, the sensors are easily adversely affected by light intensity resulting in challenges in obtaining highly accurate three-dimensional information of the target.

Light detection and ranging (LiDAR) systems also are often employed in autonomous vehicles, and while these systems may not be as easily affected by light intensity, the systems oftentimes lack the high-resolution of the camera-based imaging systems.

Environmental perception of autonomous vehicles using a single sensor often leads to missed detection. Utilizing multiple types of sensors may benefit from the advantages of each respective sensor, but the acquired data from the multiple sensors must be synchronized in real time to provide accurate target detection. This includes real time spatial synchronization of the data.

However, the conventional synchronization calibration method of collecting calibration points manually is very time consuming and oftentimes results in low calibration accuracy.

Accordingly, there is a need for an automated multi-sensor spatial data synchronization system and method to overcome these deficiencies.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the system according to exemplary embodiments hereof provides a system and method to synchronize spatial data from multiple sensors in real time. In some embodiments, the system provides a system and method to synchronize spatial data from a LiDAR assembly and a camera assembly in real time.

To accomplish this, the system determines the corner points and center point coordinates in the laser point cloud data and in the image calibration board data, and then using these coordinates, calculates the spatial synchronization relationship between the two sensors. The result is a improvement in the synchronization precision in comparison to other methods of manually selecting the calibration points.

In some embodiments, the system and method may be applied to the technical field and practical application of autonomous vehicle sensor systems.

Figure 1:
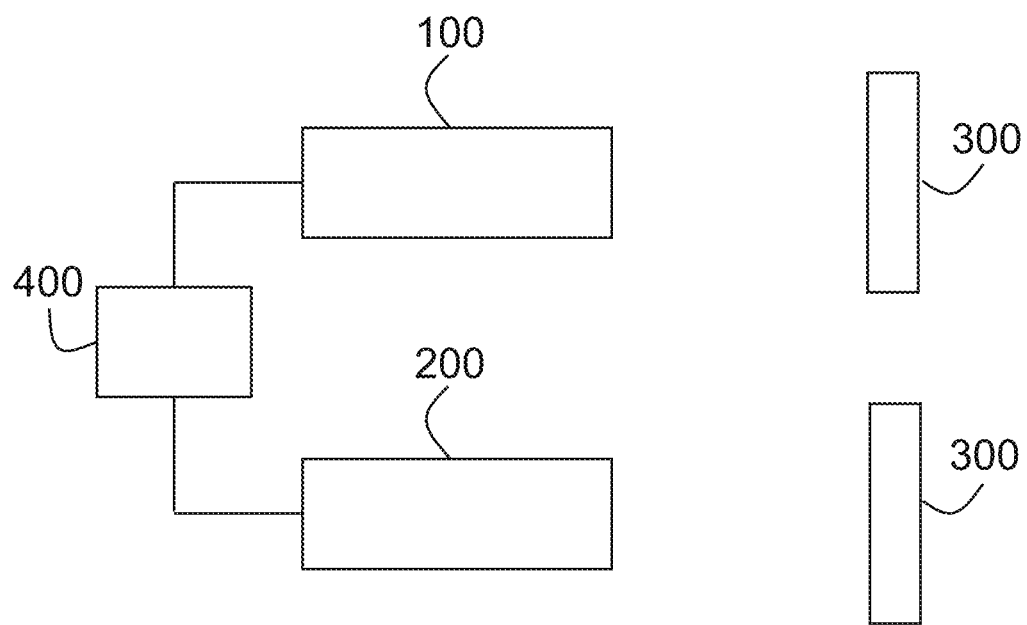
FIG. 1 shows an overview of a multi-sensor spatial data auto-synchronization system in accordance with exemplary embodiments hereof.

FIG. 1 shows an overview of the multi-sensor spatial data auto-synchronization system 10 (also referred to herein as simply the system 10) according to exemplary embodiments hereof. As shown, the system 10 includes a LiDAR assembly 100, a camera assembly 200, one or more calibration boards 300, and a controller 400. In general, the controller 400 controls the LiDAR assembly 100 and the camera assembly 200 during the calibration of the assemblies 100, 200 to collect calibration data, and/or during the use of the assemblies 100, 200 to collect real world sensor data (during which the controller 400 may implement the calibration data). The system 10 may include other elements and components as necessary for the system 10 to perform its functionalities as described herein.

Note that the assemblies 100, 200, 300, 400 shown in FIG. 1 are represented as simple blocks to demonstrate the general relationship between the assemblies 100, 200, 300, 400, and that FIG. 1 does not represent the exact sizes, locations, orientations and/or other characteristics of the assemblies 100, 200, 300, 400.

Figure 2:
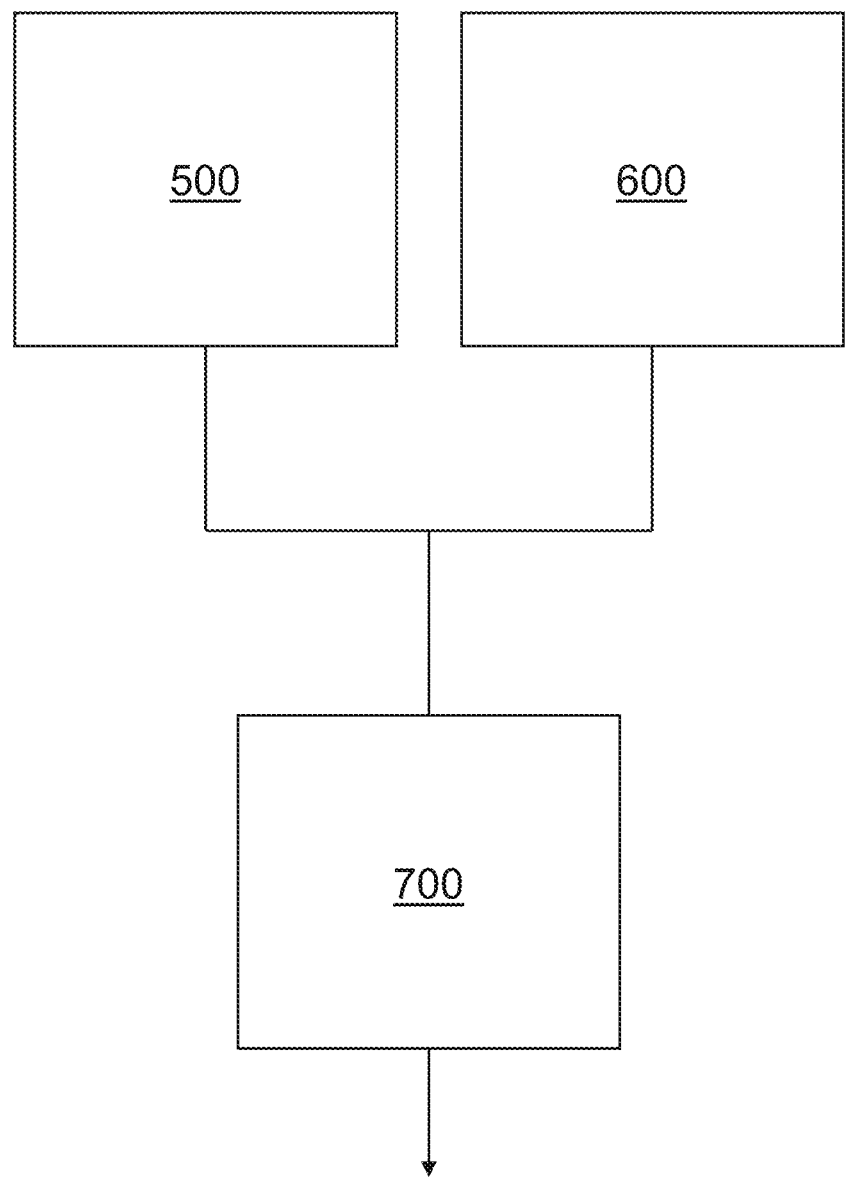
FIGS. 2-5 show actions taken by the multi-sensor spatial data auto-synchronization system of FIG. 1 in accordance with exemplary embodiments hereof.

In some embodiments as shown in FIG. 2, the system 10 implements an auto-synchronization between the LiDAR assembly 100 and the camera assembly 200 in an overall three-step process. In the first step (at 500), the system 10 calibrates the LiDAR assembly 100, and in a second step (at 600), the system 10 calibrates the camera assembly 200. It is preferable that the system 10 perform the first step 500 and the second step 600 simultaneously. In the third step (at 700) the system 10 uses the results from steps 500 and 600 to calculate a spatial synchronization relationship between the LiDAR assembly 100 and the camera assembly 200 (e.g., the system 10 outputs one or more transformation matrices for the two sensors 100, 200).

It is understood that the steps 500, 600, 700 are shown for demonstration and that other actions also may be taken. It also is understood that not all of the actions described must be taken and that the actions may be performed in different order(s).

Figure 3:
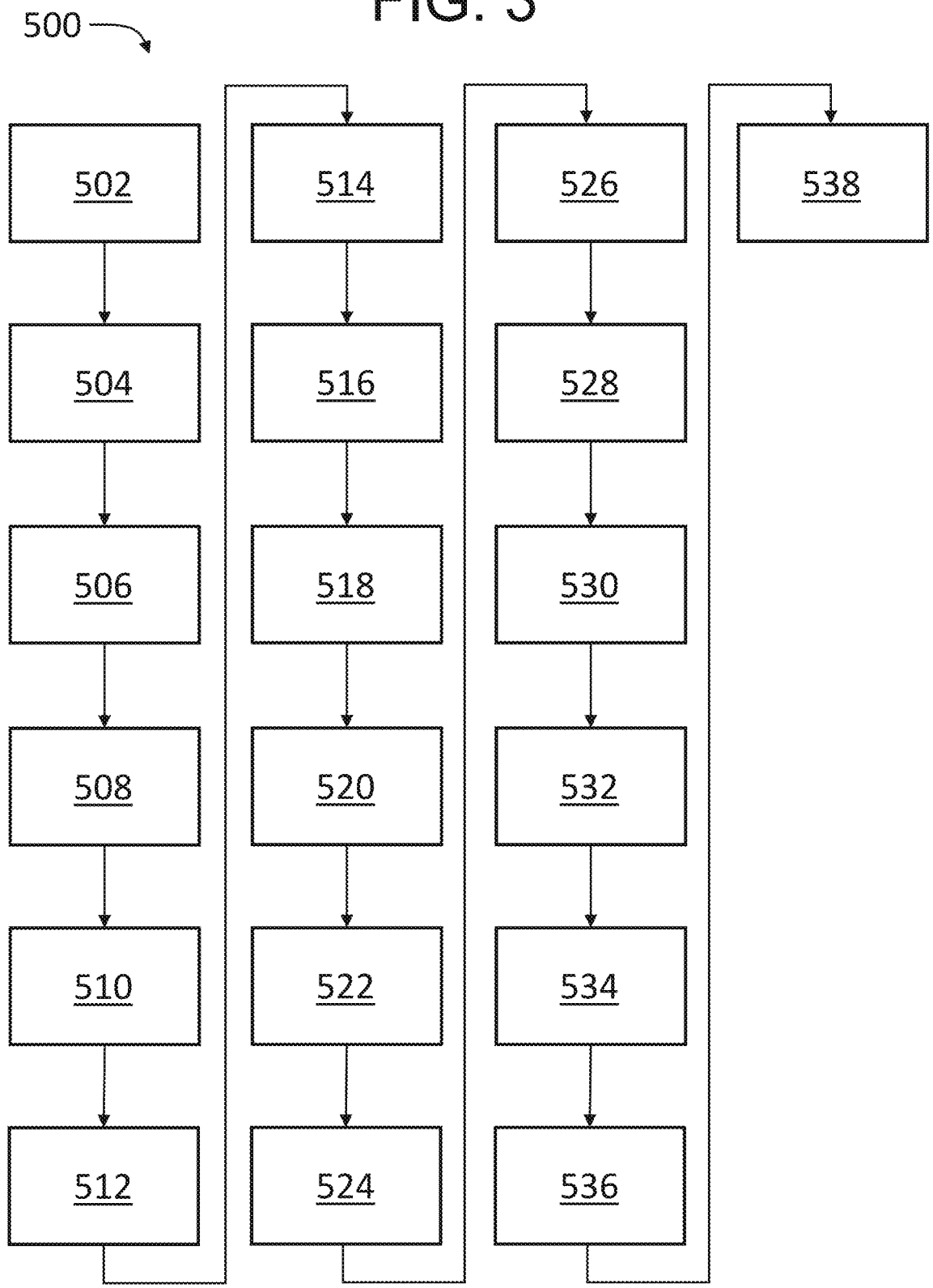

FIG. 3 refers to actions that the system 10 may take to complete step 500 of FIG. 2.

First (at 502), the LiDAR assembly 100 is configured with its respective calibration board 300. Next, (at 504), the controller 400 may cause the LiDAR assembly 100 to collect laser point cloud data of the board 300.

Next (at 506), the data acquired in 504 is coarsely-cropped (e.g., manually) and a LiDAR region of interest (ROI) for the calibration board detection is determined (at

508). This may include dynamically adjusting system parameters (e.g., parameters in a rqt_reconfigure plugin within the system 10) to determine the LiDAR ROI, where the dynamically adjusted parameters are maximum values and minimum values in the X-axis direction of the point cloud, maximum values and minimum values in the Y-axis direction of the point cloud, and maximum values and minimum values in the Z-axis direction of the point cloud.

Then (at 510), in the LiDAR ROI, the system 10 may perform precise extraction of a calibration board region according to a point cloud value of a highest point in a point cloud region and a length value of a diagonal line of the calibration board 300.

Next (at 512), the system 10 may perform plane fitting on the laser point cloud data extracted in 508 and collect (at 514) normal vectors of coordinates of a plane and plane fitting parameters.

In some embodiments, the system 10 may employ the plane fitting formula shown below:

$$ax+by+cz=d,$$

wherein a,b,c represent normal vectors of planes x,y,z respectively, and satisfy the formula: $a^2+b^2+c^2=1$;

where d is a distance from the origin of the coordinates to a chessboard plane;

values of a,b,c,d are solved by using the least squares method, for any point cloud value $x_i,y_i,z_i$ within the plane of the calibration board;

a distance $d_i$ from the point to the plane is calculated according to a calculated plane fitting equation, expressed as $x_i+y_i+z_i=d$, by setting a plane threshold $\Delta d$; and if $|d_i-d|<\Delta d$ the point is considered to fall in the plane of the calibration board.

It also is understood that other suitable plane fitting formulas also may be employed.

Figure 6:
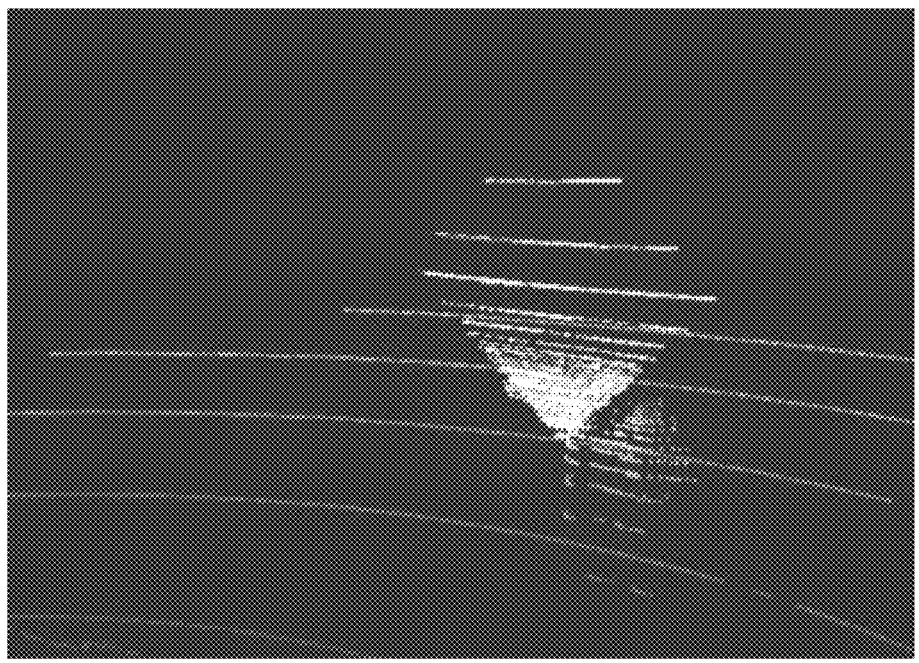
FIG. 6 is a schematic diagram of a fitted plane after projection in accordance with exemplary embodiments hereof.

Continuing on (at 516), the system 10 may project, according to the plane fitting parameters determined above, the segmented laser point cloud data onto the plane obtained through fitting to obtain reflection points on a surface of the calibration board 300. An example of a resulting fitted plane is shown in FIG. 6.

Figure 7:
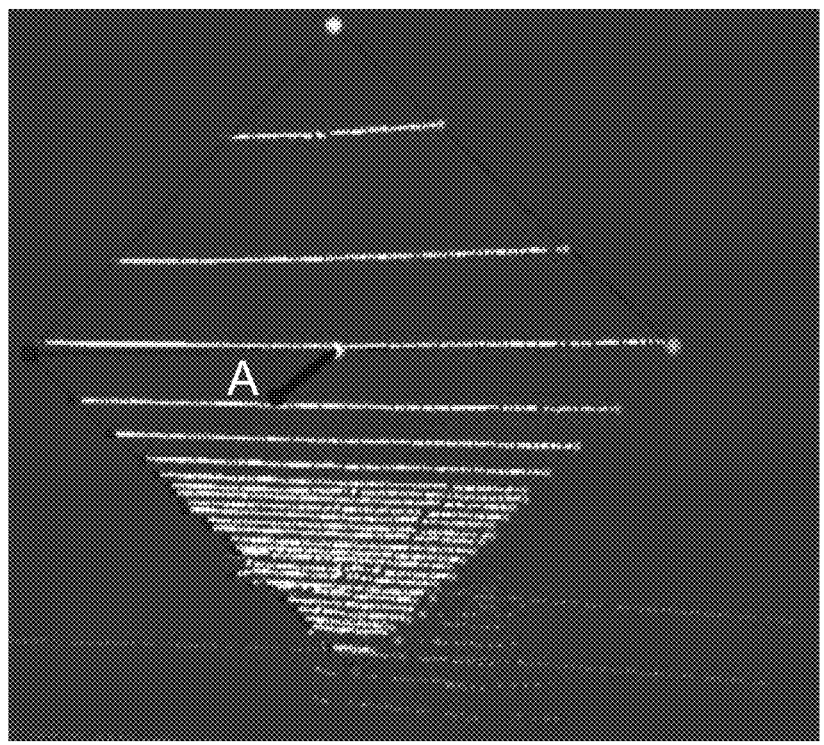
FIG. 7 is a coordinate diagram of corner points and center point of a calibration board in accordance with exemplary embodiments hereof.

Next (at 518), the system 10 may obtain an edge point cloud in the fitted plane (e.g., point cloud data at the edge of the calibration board 300). Then, the system 10 may use a Random Sample Consensus (RANSAC) algorithm to complete the straight line fitting according to the point cloud data at the edge of the calibration board 300. This may first include taking two points randomly in a point set (at 520), solving straight line parameters formed by the two point (at 522), calculating distances between remaining points in the point set and the straight line (at 524), counting the number of intrinsic points whose distances are less than a set distance threshold (at 526), similarly, finding a point set with the largest number of interior points (at 528), and finally, fitting the points in the point set to a straight line by using the least squares method (at 530); similarly, performing straight-line fitting on data of four edges to obtain four line segments (at 532), and finally, obtaining four corner points of the calibration board by solving intersection points between the four line segments (at 534). This also may include using a correlation method for PCL intrinsic points to obtain coordinate values corresponding to corner points on the calibration board 300 (at 536) and determining top point coordinates and center point coordinates of the calibration board 300 (at 538), where the top point and center points are shown in FIG. 7, with the center point normal vector of the calibration board 300 indicated by the center arrow A.

It is understood that the actions of step 500 are shown for demonstration and that other actions also may be taken. It also is understood that not all of the actions described must be taken and that the actions may be performed in different order(s).

Figure 4:
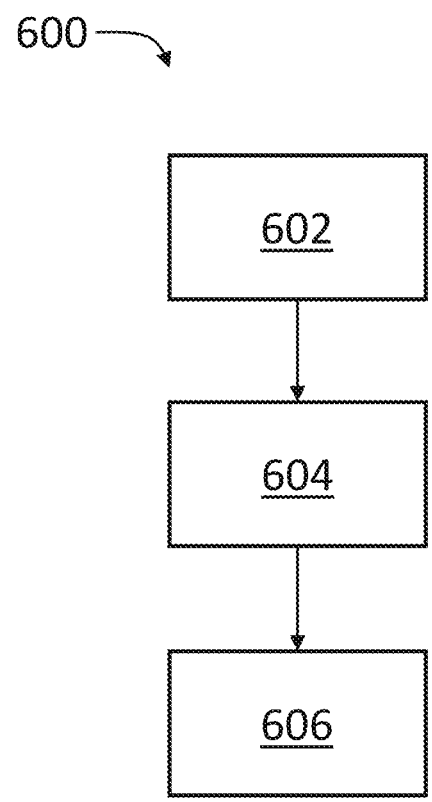

FIG. 4 refers to actions that the system 10 may take to complete step 600 of FIG. 2. As described above, it may be preferable for the system 10 to perform the actions of step 600 simultaneously with the actions of 500.

First (at 602), the camera assembly 200 is configured with its respective calibration board 300. Next, (at 604), the controller 400 may cause the camera assembly 200 to collect image point cloud data of the board 300.

Next (at 606), the system 10 may enter a camera calibration interface and use an OpenCV function library to obtain an image feature extraction result, where the image feature extraction result includes: (i) four corner point coordinates corresponding to the image point cloud data on the calibration board 300, (ii) corner point coordinates of a calibration grid, and (iii) the normal vector of the center point of the calibration board 300.

Figure 8:
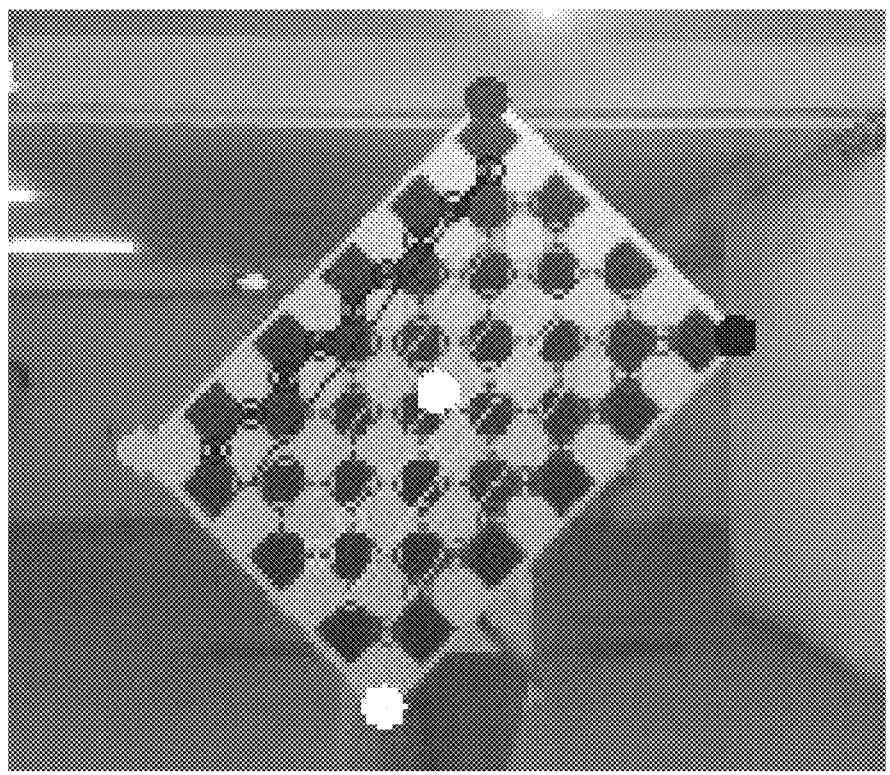
FIG. 8 is a coordinate diagram of an image feature extraction result in accordance with exemplary embodiments hereof.

FIG. 8 shows a schematic diagram of the image feature extraction result showing (i), (ii), and (iii) from above.

It is understood that the actions of step 600 are shown for demonstration and that other actions also may be taken. It also is understood that not all of the actions described must be taken and that the actions may be performed in different order(s).

Figure 5:
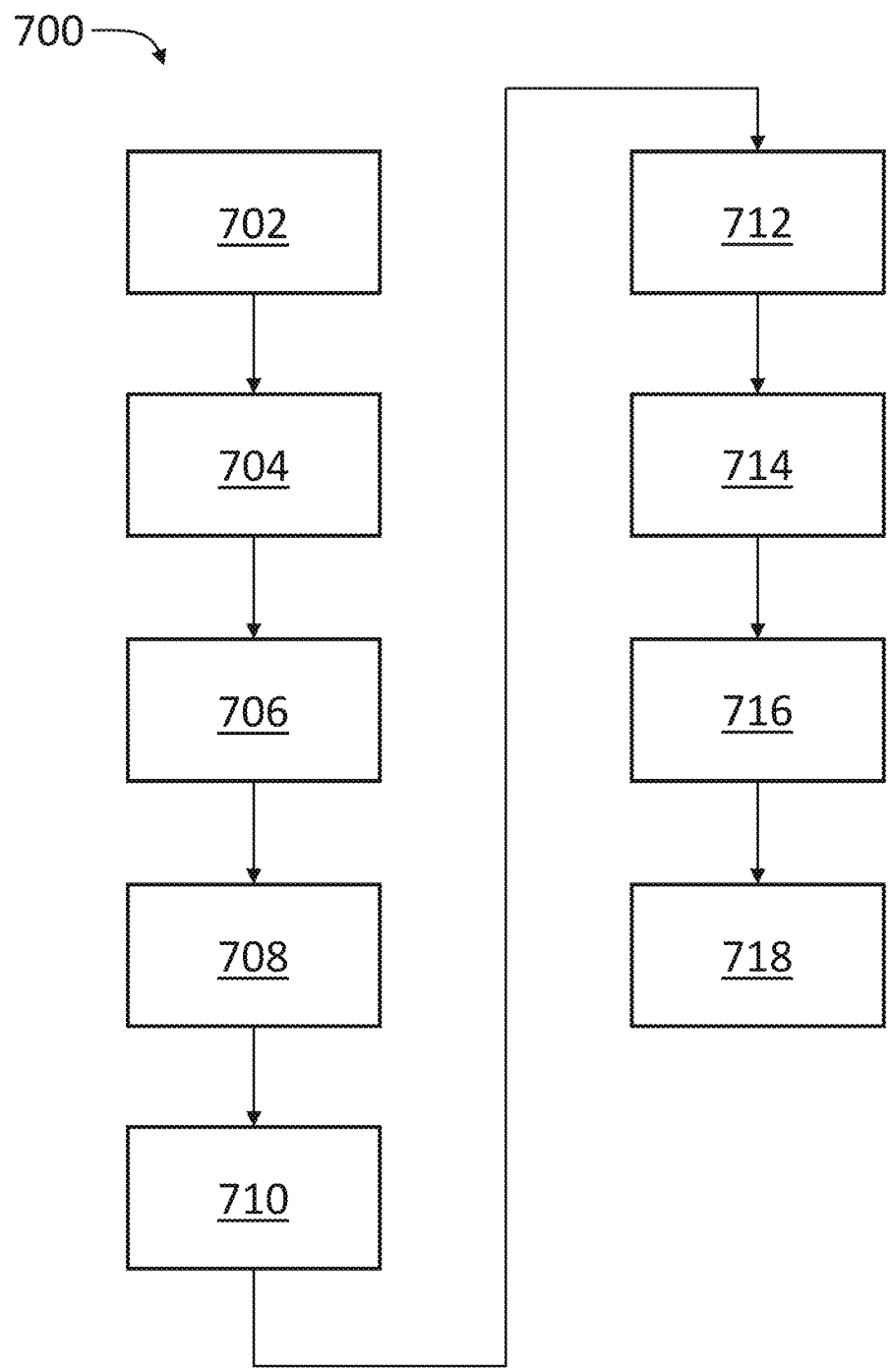

FIG. 5 refers to actions that the system 10 may take to complete step 700 of FIG. 2.

First (at 702), the system 10 may utilize a Perspective-n-Point (PNP) algorithm to calculate the pose transformation matrices for the laser point cloud data coordinates and an image feature data result. Next (at 704), the system 10 may optimize the rotation vector and the translation vector in the transformation matrix according to center point normal vectors corresponding to the laser point cloud data and the image point cloud data, respectively, on the calibration board(s) 300. Starting points of the two sets of normal vectors are translated (at 706) so that the starting points of the two sets of center point normal vectors coincide, and (at 708), the starting points of center point normal vectors in a camera coordinate system are converted to starting points of a center point normal vector in a laser coordinate system. Then (at 710), the difference between the two is calculated to achieve optimization of a translation vector in the transformation matrix.

With an understanding that the starting points of the two sets of center point normal vectors coincide, Euler angles of the center point normal vectors in the camera coordinate system are converted to Euler angles of the center point normal vectors in the laser coordinate system (at 712), a difference between the two is calculated (at 714), optimization is performed on the rotation vector of the transformation matrix (at 716), and calibration of the extrinsic parameters of the two sensors 100, 200 is completed. Then (at 718), the system 10 may output a final transformation matrix for use with the sensors 100, 200.

It is understood that the actions of step 700 are shown for demonstration and that other actions also may be taken. It also is understood that not all of the actions described must be taken and that the actions may be performed in different order(s).

Additional embodiments and details of the system 10 will be described by way of an example. The example provided below is chosen to illustrate various embodiments and implementations of the system 10, and those of ordinary skill in the art will appreciate and understand, upon reading this description, that the example is not limiting and that the system 10 may be used in different ways. It also is understood that details of different embodiments described in different examples may be combined in any way to form additional embodiments that are all within the scope of the system 10.

Example 1

In a first example, the following actions are performed to calibrate the system 10.

First, the LiDAR assembly 100 is configured with its respective calibration board 300 and caused (e.g., by the controller 400) to collect laser point cloud data of the board 300. Next, the collected point cloud data is cropped and the region of interest (ROI) for the calibration board is determined.

This may be accomplished by using the following equations:

$$0.1 < \sum_{i=0}^{n} Px < 10$$

$$-5 < \sum_{i=0}^{n} Py < 5$$

$$0.1 < \sum_{i=0}^{n} Pz < 5$$

where:
P represents each point cloud data collected by the LiDAR assembly 100; and
x, y, and z represent the distance value of each point on the x, y, and z axis shown in FIG. 1.

In this example, the area of the point cloud is cropped in the direction of the x-axis. The range along the x-axis is 0.1 m to 10 m, the cutting range in the y-axis direction (perpendicular to the x-axis) is 5 m to the right and to the left, and the range along the z-axis (perpendicular to the ground) is selected as 0.1 m to 5 m.

In the process of point cloud precision cutting, according to the maximum value of the point cloud coordinate Z-axis in the area of the point cloud calibration plate, and the diagonal length of the calibration plate obtained by our actual measurement, the point cloud data of the area where the calibration plate is located is determined.

This may be accomplished by using the following equations.

$$Pz\_max = \max\left\{\sum_{i=0}^{n} Pz\right\}$$

$$Pz\_min = Pz\_max - l$$

where:
P represents the represents the point cloud data that meets the threshold of the crop area after rough cropping;
P z_max represents the maximum value of the point cloud data for fine cropping;
P z_min represents the point cloud data for fine cropping; and
the minimum value of $l$ represents the length of the diagonal of the calibration plate.

Next, the plane point cloud data of the calibration plate is plane fitted using the equation below:

$$ax+by+cz=d$$

where:
a, b, c represent the normal vectors of the plane which satisfies the formula $$a^2+b^2+c^2=1;$$

d is the distance from the origin of the coordinate to the calibration board 300 checkerboard plane.

The values of a, b, c, d are obtained by the least square method for any point cloud value $x_i$, $y_i$, $z_i$ in the plane of the calibration board 300 fit according to the calculated plane.

The equation calculates the distance $d_i$ between the point and the plane, which is expressed as:

$$x_i+y_i+z_i=d_i$$

By setting the plane threshold, $\Delta d$, if $|di-d|<\Delta d$, the point is considered to belong to the plane of the calibration board 300. After the plane to which the calibration board 300 belongs is determined, the obtained plane coefficients are used to calculate the point cloud coordinates. The projection of [MISSING?] maps some points that do not fall on the plane and performs straight-line fitting on the point cloud in the processed fitting plane. The fitting method preferably uses RANSAC straight-line fitting calculation and fits 4 y=ax+b.

Next, the four intersection points of the four-line segments and the intersection points of the diagonal lines are calculated to obtain the four intersection points, center points, and center points normal vectors of the point cloud data in the fitting plane.

Next, the corner points and center point coordinates of the image checkerboard calibration board 300 are obtained. In some embodiments, it may be preferable to use the OpenCV calibration tool and the Zhang Zhengyou calibration method to obtain the corner points and the camera assembly's 200's internal and external parameters.

To accomplish this, first, the findChessboardCorners( ) function may be used to obtain the corner pixel information of the chessboard calibration board 300. Next, the pixel positions of the four corner points, the intersection point of the diagonal lines of the four corner points, and the normal vector of the center point may be obtained.

Next, the rotation and translation matrix obtained after the PNP algorithm is applied to the two sets of center points and the four corner points is optimized, and the center points normal vector under the point cloud data and the center point normal vector under the image data are respectively used.

Next, the projection transformation formula shown below is used to project the point cloud data from the LiDAR coordinate system to the pixel coordinate system.

$$\begin{cases} u_x = \dfrac{cloudpoint_x * f_x}{cloudpoint_z + c_x} \\ v_y = \dfrac{cloudpoint_y * f_y}{cloudpoint_z + c_y} \end{cases}$$

where:
$u_x$, $v_y$ represents the coordinate data of the cloud point data in the image pixel coordinate system after transformation;

cloudpoint$_x$, cloudpoint$_y$, cloudpoint$_z$ is the determining point cloud data;

f$_x$, f$_y$ is the focal length of the (monocular) camera 200; and c$_x$, c$_y$ is the optical center coordinates of the (monocular) camera 200.

By observing the distance between the center point of the point cloud and the image center point after projection, and the yaw angle between the two sets of directions, the rotation and translation matrix is optimized and adjusted to complete the automatic calibration of the external parameters of the LiDAR assembly 100 and the camera assembly 200.

It is understood that the actions described in example above are meant for demonstration and that other actions also may be taken. It also is understood that not all of the actions must be taken, and that the actions may be taken in different orders.

It also is understood that any aspect or element of any embodiment of the system 10 as described herein or otherwise can be combined with any other embodiment of the system 10 to form additional embodiments of the system 10, all of which are in the scope of the system 10.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 9:
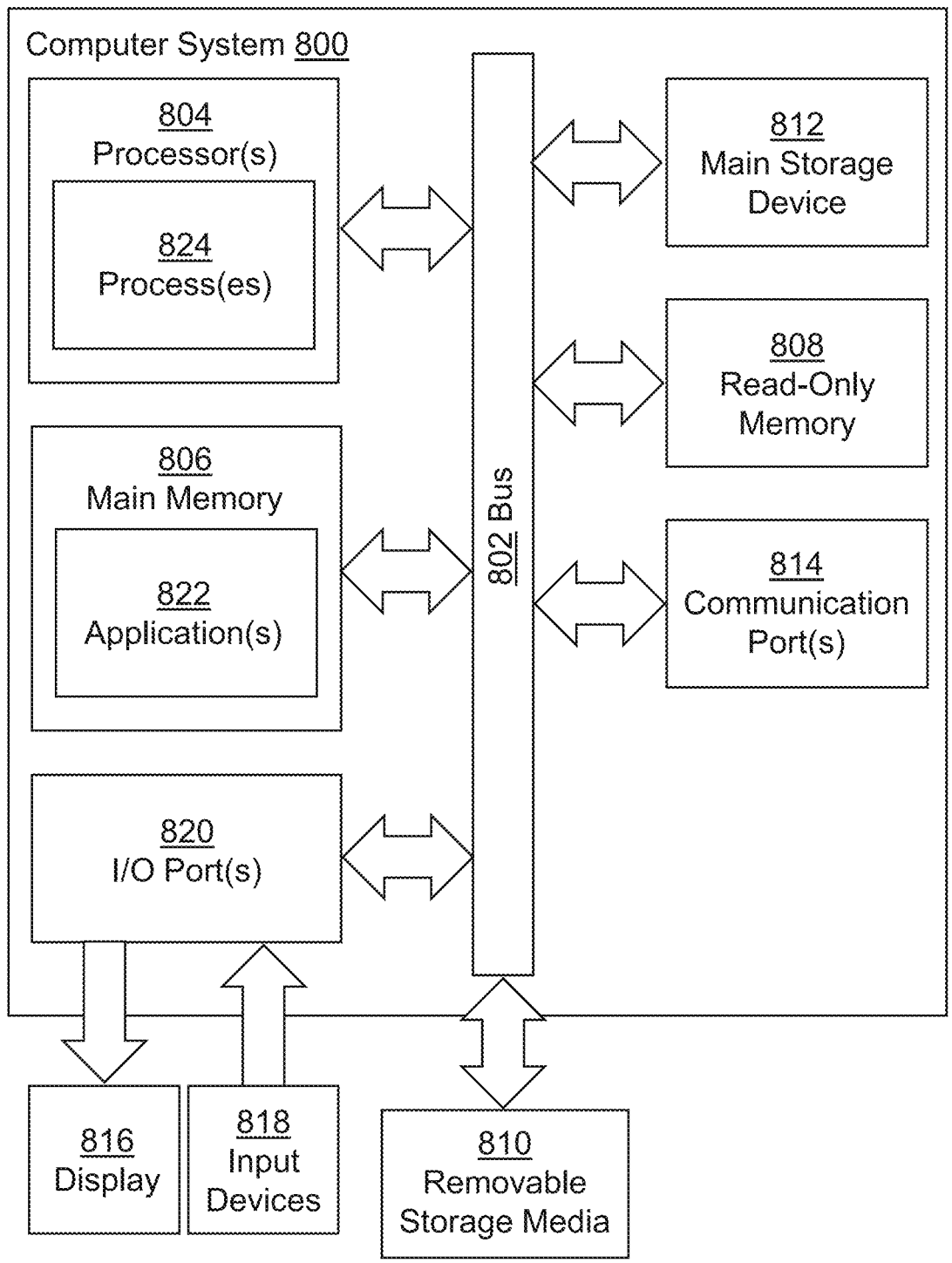
FIG. 9 depicts aspects of computing and computer devices in accordance with exemplary embodiments hereof.

FIG. 9 is a schematic diagram of a computer system 800 upon which embodiments of the present disclosure may be implemented and carried out.

According to the present example, the computer system 800 includes a bus 802 (i.e., interconnect), one or more processors 804, one or more communications ports 814, a main memory 810, removable storage media 810, read-only memory 808, and a mass storage 812. Communication port(s) 814 may be connected to one or more networks by way of which the computer system 800 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 804 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 814 can be any of an RS-232 port for use with a modem-based dial-up connection, a 10/100 Ethernet port, a Gigabit port using copper or fiber, or a USB port, and the like. Communications port(s) 814 may be chosen depending on a network such as a Local Area Network (LAN), a Wide Area Network (WAN), a CDN, or any network to which the computer system 800 connects. The computer system 800 may be in communication with peripheral devices (e.g., display screen 810, input device(s) 818) via Input/Output (I/O) port 820. Some or all of the peripheral devices may be integrated into the computer system 800, and the input device(s) 818 may be integrated into the display screen 810 (e.g., in the case of a touch screen).

Main memory 810 can be Random Access Memory (RAM), or any other dynamic storage device(s) commonly known in the art. Read-only memory 1608 can be any static storage device(s) such as Programmable Read-Only Memory (PROM) chips for storing static information such as instructions for processor(s) 804. Mass storage 812 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 802 communicatively couples processor(s) 804 with the other memory, storage and communications blocks. Bus 802 can be a PCI/PCI-X, SCSI, a Universal Serial Bus (USB) based system bus (or other) depending on the storage devices used, and the like. Removable storage media 810 can be any kind of external hard-drives, floppy drives, IOMEGA® Zip Drives, Compact Disc—Read Only Memory (CD-ROM), Compact Disc—Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 810 is encoded with application(s) 822 that support(s) the functionality as discussed herein (an application 822 may be an application that provides some or all of the functionality of one or more of the mechanisms described herein). Application(s) 822 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 804 accesses main memory 810 via the use of bus 802 in order to launch, run, execute, interpret or otherwise perform the logic instructions of the application(s) 822. Execution of application(s) 822 produces processing functionality of the service(s) or mechanism(s) related to the application(s). In other words, the process(es) 824 represents one or more portions of the application(s) 822 performing within or upon the processor(s) 804 in the computer system 800.

It should be noted that, in addition to the process(es) 824 that carries(carry) out operations as discussed herein, other embodiments herein include the application 822 itself (i.e., the un-executed or non-performing logic instructions and/or data). The application 822 may be stored on a computer readable medium (e.g., a repository) such as a disk or in an optical medium. According to other embodiments, the application 822 can also be stored in a memory type system such as in firmware, read only memory (ROM), or, as in this example, as executable code within the main memory 810 (e.g., within Random Access Memory or RAM). For example, application 822 may also be stored in removable storage media 810, read-only memory 808, and/or mass storage device 812.

Those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method for synchronizing data from multiple sensors comprising:
   (A) using a laser and a calibration board to collect first laser point cloud data;
   (B) cropping the first laser point cloud data to determine a region of interest in the first laser point cloud data;
   (C) determining a calibration board region in the region of interest according to a point cloud value of a highest point in a point cloud region and a length value of a diagonal line of the calibration board;
   (D) plane fitting the calibration board region determined in (C) to determine a fitted plane including plane fitting parameters;
   (E) collecting normal vectors of coordinates of the fitted plane and plane fitting parameters;
   (F) projecting, according to the plane fitting parameters, a segmented laser point cloud data onto the fitted plane to obtain reflection points on a surface of the calibration board;
   (G) performing straight line fitting on laser point cloud data at an edge of the fitted plane, determining laser point cloud data coordinates at four corner point positions of the calibration board corresponding to the straight line fitting, and determining top point coordinates and a normal vector of a center point of the calibration board for the laser point cloud data;
   (H) using a camera and a calibration board to collect image point cloud data;
   (I) determining four corner point coordinates corresponding to the image point cloud data on the calibration board, determining corner point coordinates of a calibration grid, and determining a normal vector of a center point of the calibration board for the image point cloud data;
   (J) calculating a pose transformation matrix for the laser point cloud data coordinates and an image feature data result;
   (K) optimizing a rotation vector and a translation vector in the pose transformation matrix; and
   (L) outputting a final transformation matrix.

2. The method of claim 1 wherein the actions in (G) further comprise:
   (G)(1) obtaining an edge point cloud in the fitted plane;
   (G)(2) using a RANSAC algorithm to complete a straight line fitting according to the point cloud data at the edge of the calibration board;
   (G)(3) solving corner points corresponding to a line segment on the calibration board; and
   (G)(4) using a correlation method for PCL intrinsic points to obtain coordinate values corresponding to corner points on the calibration board.

3. The method of claim 1 wherein the actions in (K) further comprise:
   (K)(1) translating a starting point of the rotation vector and a starting point of the translation vector to align a starting point of the normal vector of a center point of the calibration board for the laser point cloud data determined in (G) with a starting point of the normal vector of a center point of the calibration board for the image point cloud data determined in (I);
   (K)(2) converting the starting point of the normal vector of a center point of the calibration board for a camera coordinate system to the starting point of the normal vector of a center point of the calibration board for a laser coordinate system; and
   (K)(3) calculating a difference between the starting point of the center point of the calibration board for a camera and the starting point of the center point of the calibration board for the laser.

4. The method of claim 3 further comprising:
   (K)(4) converting Euler angles of the center point normal vector in the camera coordinate system to Euler angles of the center point normal vector in the laser coordinate system;
   (K)(5) calculating the difference between the Euler angles of the center point normal vector in the camera coordinate system and the Euler angles of the center point normal vector in the laser coordinate system; and
   (K)(6) optimizing a rotation vector of the transformation matrix.

* * * * *